(12) United States Patent
Nakayama et al.

(10) Patent No.: US 10,479,207 B2
(45) Date of Patent: Nov. 19, 2019

(54) ARRANGEMENT STRUCTURE OF WHEEL DRIVE SYSTEM

(71) Applicant: NISSAN MOTOR CO., LTD., Yokohama-shi, Kanagawa (JP)

(72) Inventors: Hiroyuki Nakayama, Kanagawa (JP); Yukio Mizukoshi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/741,867

(22) PCT Filed: Jul. 7, 2015

(86) PCT No.: PCT/JP2015/069523
§ 371 (c)(1),
(2) Date: Jan. 4, 2018

(87) PCT Pub. No.: WO2017/006429
PCT Pub. Date: Jan. 12, 2017

(65) Prior Publication Data
US 2018/0215271 A1  Aug. 2, 2018

(51) Int. Cl.
*B60K 7/00* (2006.01)
*B60L 7/16* (2006.01)
*B60K 1/02* (2006.01)
*B60K 1/00* (2006.01)
*F16D 127/04* (2012.01)

(52) U.S. Cl.
CPC .................. *B60L 7/16* (2013.01); *B60K 1/00* (2013.01); *B60K 1/02* (2013.01); *B60K 7/00* (2013.01); *B60K 7/0007* (2013.01); *B60K 2007/0038* (2013.01); *B60K 2007/0061* (2013.01); *B60L 2210/44* (2013.01); *B60L 2220/44* (2013.01); *B60L 2240/423* (2013.01); *B60Y 2400/61* (2013.01); *B60Y 2400/81* (2013.01); *F16D 2127/04* (2013.01)

(58) Field of Classification Search
CPC .... H02K 11/33; H02K 5/225; B60L 2220/44; B60L 2220/46; B60K 7/0007; B60K 2007/0038; B60K 2007/0092
See application file for complete search history.

(56) References Cited

U.S. PATENT DOCUMENTS 5,164,623 A * 11/1992 Shkondin ................. A61G 5/04
                                                                  310/148
5,633,544 A *  5/1997 Toida ..................... B60K 7/0007
                                                                  180/65.1

(Continued)

FOREIGN PATENT DOCUMENTS

EP       2 394 903 A1     12/2011
JP       2013-063727 A     4/2013

*Primary Examiner* — Emma K Frick
(74) *Attorney, Agent, or Firm* — Foley & Lardner LLP

(57) ABSTRACT

An arrangement structure of a wheel drive system comprising a tire wheel and a drive unit for driving the tire wheel, wherein the tire wheel includes a brake part arranged to a hollow space of the tire wheel, the drive unit includes a motor and an inverter for driving the motor, the inverter includes a power module for supplying power to the motor and a bus bar for supplying power supplied from outside the tire wheel to the power module, and the bus bar is arranged to the brake part side than the power module.

13 Claims, 17 Drawing Sheets

(56) References Cited

U.S. PATENT DOCUMENTS

| | | | | |
|---|---|---|---|---|
| 5,796,192 A * | 8/1998 | Riepl | | A61G 5/04 310/67 R |
| 6,838,790 B2 | 1/2005 | Arimitsu | | H02K 1/08 310/114 |
| 6,864,604 B2 * | 3/2005 | Nakano | | H02K 1/18 310/114 |
| 6,903,471 B2 | 6/2005 | Arimitsu | | B60K 6/445 310/113 |
| 7,119,468 B2 * | 10/2006 | Shkondin | | B60L 11/007 310/114 |
| 7,193,344 B2 * | 3/2007 | Kabasawa | | B60K 6/26 310/71 |
| 7,195,087 B2 | 3/2007 | Hatsuda | | B60K 6/26 180/65.285 |
| 7,211,912 B2 * | 5/2007 | Takenaka | | H02K 11/33 310/54 |
| 7,362,001 B2 | 4/2008 | Kusumi | | H02J 7/248 290/31 |
| 7,800,276 B2 * | 9/2010 | Purvines | | H02K 1/2733 310/101 |
| 8,013,482 B2 | 9/2011 | Kurokawa | | B60K 7/0007 310/54 |
| 8,344,566 B2 * | 1/2013 | Koshida | | B60K 6/26 310/85 |
| 8,604,654 B2 * | 12/2013 | Markow | | H02K 3/522 310/71 |
| 8,688,345 B2 * | 4/2014 | Boughtwood | | B60L 50/52 701/71 |
| 8,746,384 B2 | 6/2014 | Nakashima | | B62M 7/12 180/220 |
| 8,941,275 B2 * | 1/2015 | Genda | | B60K 1/02 310/71 |
| 9,030,063 B2 * | 5/2015 | Rawlinson | | H02K 5/20 310/52 |
| 9,123,693 B2 * | 9/2015 | Tanaka | | B62D 5/0406 |
| 9,302,577 B2 * | 4/2016 | Catalan | | B60K 7/00 |
| 9,308,829 B2 * | 4/2016 | Matsuda | | B62J 9/00 |
| 10,044,248 B2 * | 8/2018 | Fujimoto | | H02K 11/33 |
| 2005/0211490 A1* | 9/2005 | Shimizu | | B60K 1/00 180/243 |
| 2007/0199775 A1* | 8/2007 | Yasukawa | | B60T 13/741 188/73.1 |
| 2009/0102312 A1* | 4/2009 | Tsukashima | | H02K 3/522 310/215 |
| 2009/0127948 A1* | 5/2009 | Shimizu | | H02K 3/50 310/71 |
| 2014/0239750 A1* | 8/2014 | Nagao | | H02K 5/20 310/43 |
| 2014/0239755 A1* | 8/2014 | Nagao | | H02K 5/20 310/54 |
| 2014/0239758 A1* | 8/2014 | Nagao | | H02K 5/225 310/71 |
| 2014/0306563 A1* | 10/2014 | Oyama | | H02M 1/12 310/71 |
| 2014/0333120 A1* | 11/2014 | Pozzo | | B60K 7/0007 301/6.5 |
| 2016/0020678 A1* | 1/2016 | Hirano | | H02K 5/18 310/64 |
| 2017/0179786 A1* | 6/2017 | Goto | | H02K 5/225 |
| 2017/0237311 A1* | 8/2017 | Sakai | | H02K 11/33 310/71 |
| 2017/0331345 A1* | 11/2017 | Wettlaufer | | H02K 5/20 |
| 2018/0006594 A1* | 1/2018 | Furukawa | | H02P 27/06 |
| 2018/0248451 A1* | 8/2018 | Hagiwara | | H02K 11/215 |
| 2018/0272892 A1* | 9/2018 | Monkhouse | | B60K 7/0007 |
| 2019/0001990 A1* | 1/2019 | Lucas | | B60K 6/36 |

* cited by examiner

ARRANGEMENT STRUCTURE OF WHEEL DRIVE SYSTEM

TECHNICAL FIELD

The present invention relates to an arrangement structure of a wheel drive system.

BACKGROUND ART

There is known a cooling structure of an in-wheel motor for cooling an in-wheel motor unit, where a motor unit is included to an inner region of a road wheel, an inverter is disposed internally and coaxially in the vehicle width direction, and a heat conducting member is arranged to the motor unit. In the cooling structure, an extension part that extends downward is formed to the heat conducting member and by receiving travelling wind by the extension part during vehicle travelling, the extended part functions as a heat dissipation member (Patent Document 1).

PRIOR ART DOCUMENT

Patent Document

[Patent Document 1] JP 2013-63727 A

SUMMARY OF INVENTION

Problems to be Solved by Invention

However, in the in-wheel motor, when the inverter is arranged within a wheel, because the inverter becomes close to a brake part, there is a problem that the temperature of a power module inside the inverter becomes high due to heat of the brake part.

A problem to be solved by the invention is to provide an arrangement structure of a wheel drive system which can prevent the temperature of the power module inside the inverter from getting high.

Means for Solving Problems

In the present invention, the above problem is solved by disposing the brake part arranged in a hollow space of a tire wheel, arranging a power module and a bus bar for supplying power to the power module in the inverter, and arranging the bus bar closer to the a brake part than the power module.

Effect of Invention

According to the present invention, the heat generated at the a brake part is hardly transmitted to the power module by the bus bar, and thus it is possible to prevent the power module from being heated to a high temperature.

MODES FOR CARRYING OUT THE INVENTION

Figure 1:
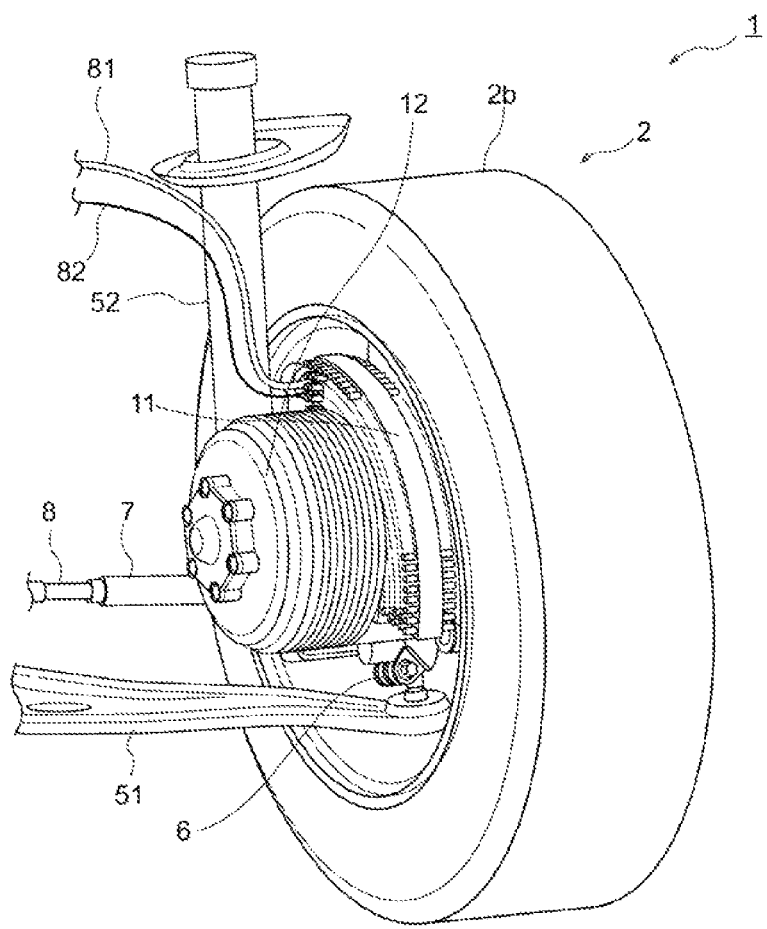
FIG. 1 illustrates a perspective view of an in-wheel motor unit according to an embodiment of the present invention.
Figure 2:
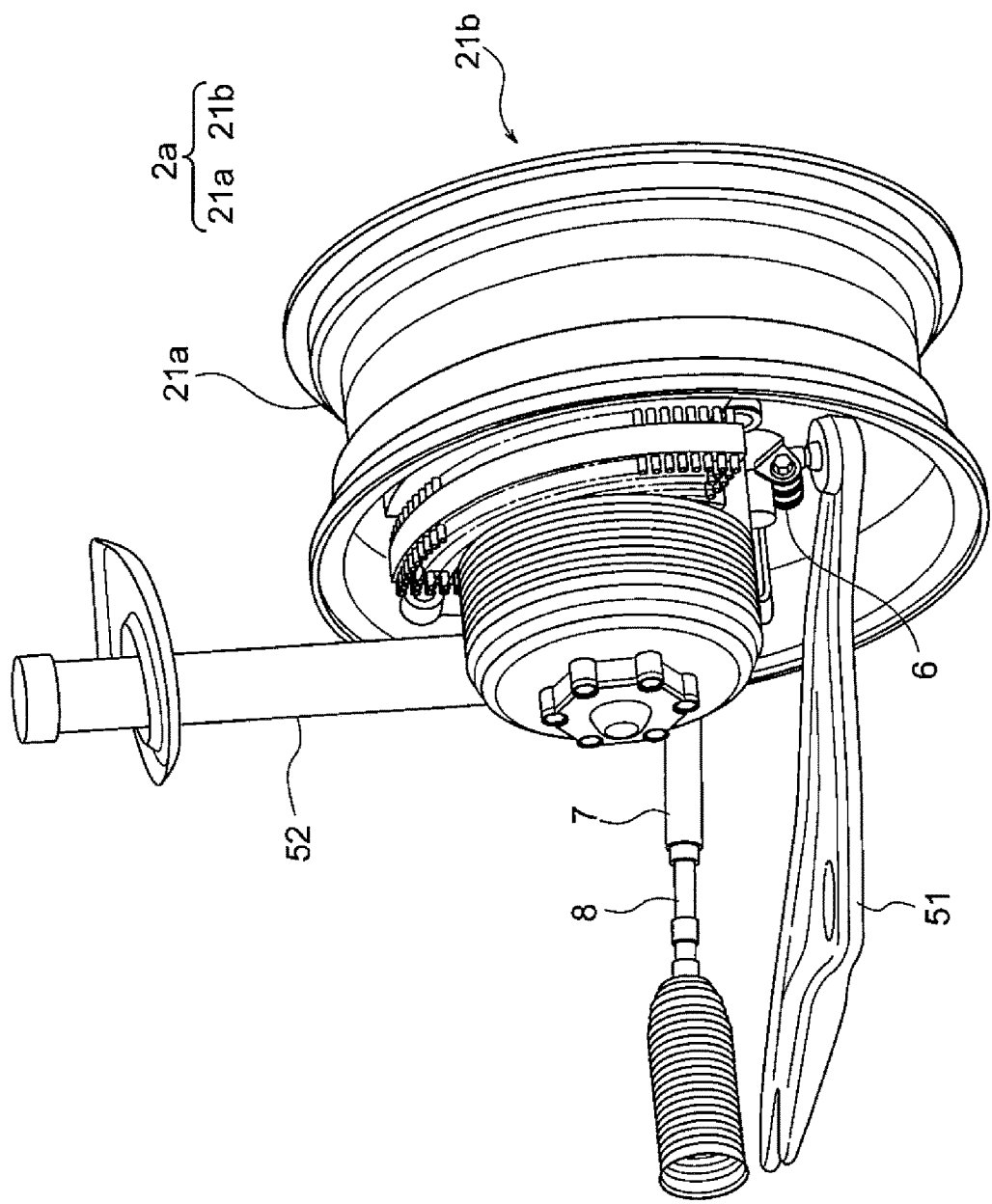
FIG. 2 illustrates a perspective view of the in-wheel motor unit according to the embodiment of the present invention.
Figure 3:
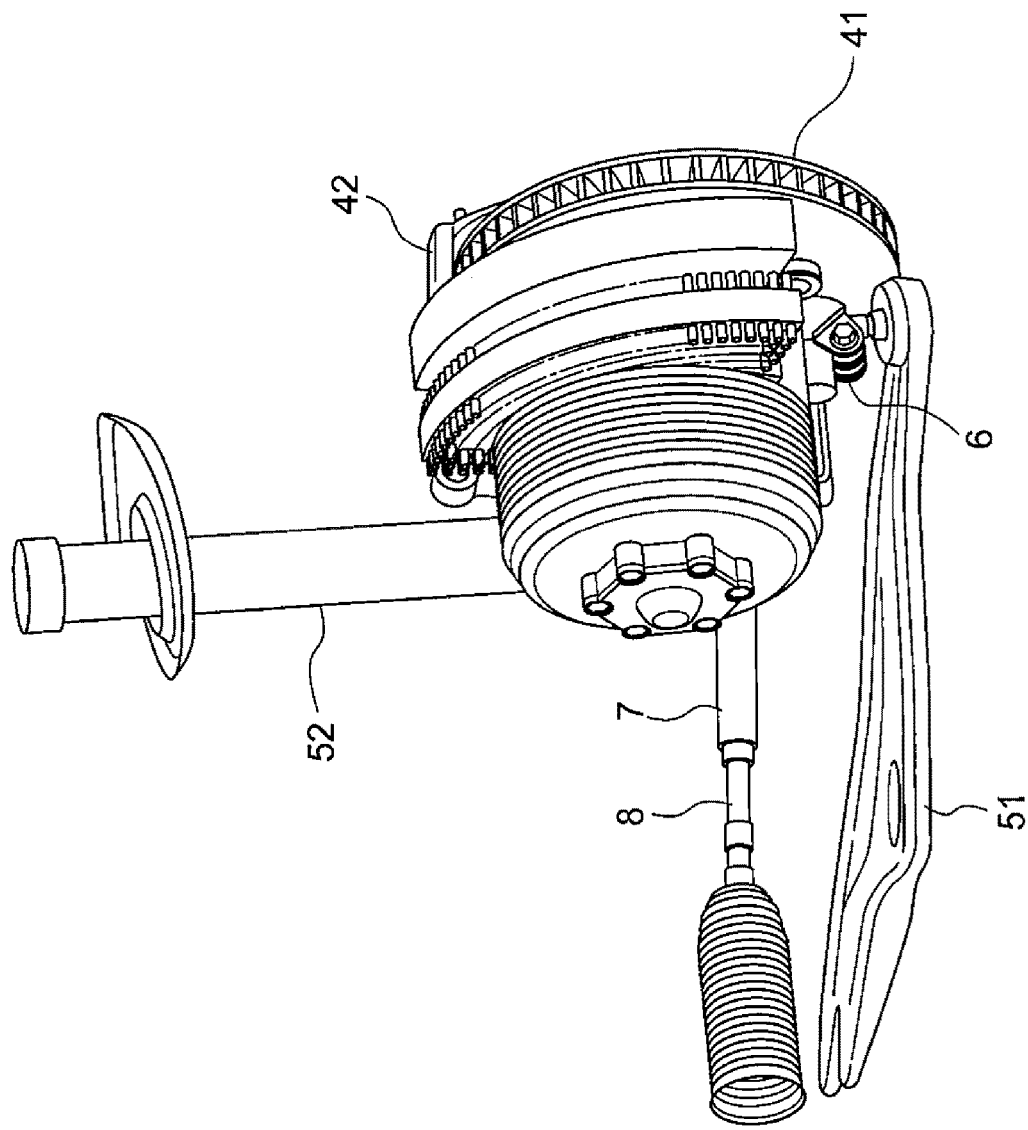
FIG. 3 illustrates a perspective view of the in-wheel motor unit according to the embodiment of the present invention.
Figure 4:
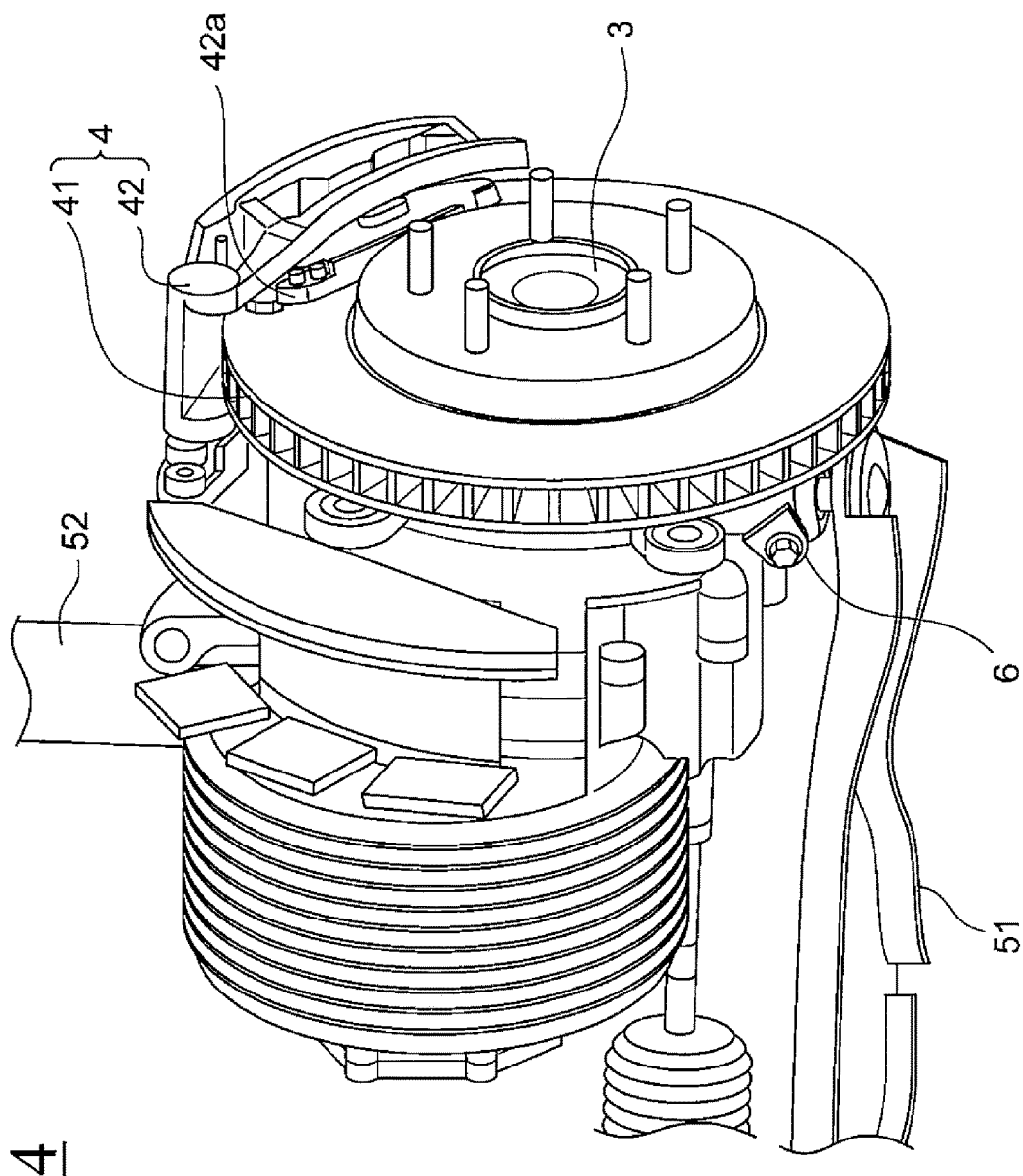
FIG. 4 illustrates a perspective view of an enlarged part of FIG. 3.

In the following, embodiments of the present invention will be explained with reference to drawings.
<First embodiment>
FIG. 1 to FIG. 4 illustrate perspective views of an in-wheel motor unit according to an embodiment of the present invention. FIG. 2 illustrates a perspective view of the unit without a tire constituting the in-wheel motor illustrated in FIG. 1. FIG. 3 illustrates a perspective view of the unit without a road wheel constituting the in-wheel motor illustrated in FIG. 2. FIG. 4 illustrates a perspective view of an enlarged part of FIG. 3.

The in-wheel motor unit 1 includes a wheel 2, a hub 3, a brake part 4, a suspension 5, a ball joint 6, a steering knuckle 7, a steering rod 8, and a drive unit 10. The wheel 2 includes a road wheel 2a and a tire 2b. The road wheel 2a is formed to a cylindrical shape. The tire 2b is attached to a rim arranged to a peripheral part 21a of the road wheel 2a. To the center part of the disk part 21b of the road wheel 2a, a hub 3 is fastened. To the road wheel 2a, a hollow space is formed and the hollow space is the space surrounded by the peripheral part 21a and disk part 21b. Inside the hollow space, the hub 3, brake part 4, and drive unit 10 are arranged. More, all components, of the drive unit 10 do not need to be arranged inside the hollow space of the road wheel 2a as long as a part of the components of the drive unit 10 is arranged inside the hollow space.

The wheel 2 is rotatably attached to an axle. The axle is supported by a suspension 5 and the vehicle body is supported by the suspension 5 and axle against a road.

The brake part 4 includes a brake rotor 41 and a caliper 42. The brake rotor 41 is fixed to the hub 3. The caliper 42 is attached to the brake rotor 41. When braking, a brake pad 42a of the caliper 42 sandwiches both surfaces of the brake rotor 41 and resistance is generated by friction.

The suspension 5 includes a transverse link 51 and strut 52. The transverse link 51 is connected to the vehicle body with a rubber bush at the end part of the inner side of the vehicle-width direction. Further, the transverse link 51 is connected to the ball joint 6 at the end part of the outer side of the vehicle-width direction. The strut 52 houses a shock absorber. To the lower part of the tubular part housing the shock absorber, the steering knuckle 7 is fixed. The steering knuckle 7, together with the axle, constitutes a knuckle spindle. The steering rod 8 is connected to the steering knuckle 7. The wheel is steered by right-left movement of the steering knuckle 7.

The drive unit 10 is a unit for driving the wheel 2. The drive unit 10 includes an inverter 11, a motor 12, and a reduction gear 13. The inverter 11 is a power converter for driving the motor 12 and is electrically connected to the motor 12. When the power module included in the inverter 11 operates, current flows to the motor 12 and motor torque is generated. The torque generated in the motor 12 is transmitted to the wheel 2 through the reduction gear 13 and the vehicle moves. The reduction gear 13 reduces the rotation output from the motor 12 and transmits the driving force to the wheel 2.

The inverter 11 is connected to a battery with a DC cable 81. Also, the inverter 11 is connected to an electronic control unit (ECU) with a control signal harness 82. The battery and ECU are arranged to the vehicle body.

As shown in FIG. 1, the DC cable 81 and control signal harness 82 are disposed along the tubular part housing the shock absorber from the outside of the in-wheel motor unit 1 and are connected to a controller inside the inverter 11.

Figure 5:
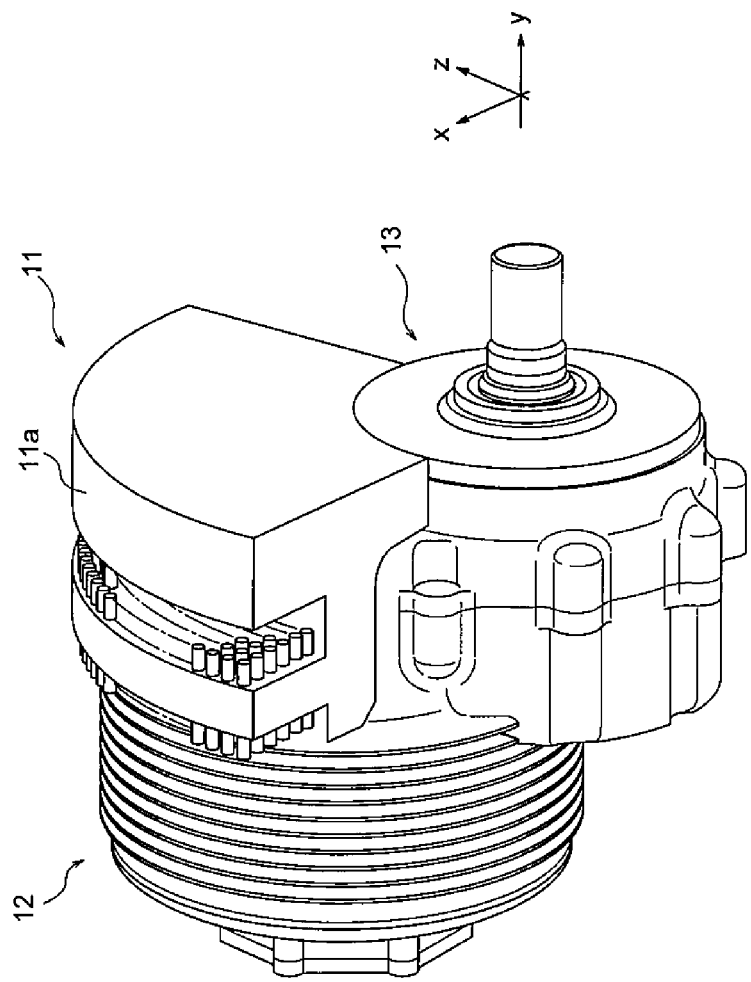
FIG. 5 illustrates a perspective view of a drive unit.

Next, using FIG. 5, structure of the drive unit 10 will be described. FIG. 5 illustrates a perspective view of the drive unit 10. In FIG. 5, the x-axis direction represents the travel direction of a vehicle, the y-axis direction represents the vehicle-width direction of the vehicle, and the z-axis direction represents the direction of vehicle height (the height that defines the vehicle height). Further, the positive direction of the y-axis represents the outward direction of the axle direction, and the negative direction of the y-axis represents the inward direction of the axle direction.

Each of the inverter 11, motor 12, and reduction gear 13 is covered by a case respectively. By combining each case together, the inverter 11, motor 12, and reduction gear 13 are unified. The inverter 11 and reduction gear 13 are arranged to the outer position than the motor 12 in the axle direction. The inverter 11 and reduction gear 13 are arranged to the same position in the axle direction. The rotary shaft of the motor 12 is connected to the shaft of the reduction gear.

The inverter 11 and reduction gear 13 are arranged in the hollow space of the road wheel 2a (see FIG. 1 and FIG. 2). The motor 12 is arranged outside the hollow space of the road wheel 2a. More, the inverter 11 is arranged outward in the vehicle-width direction relative to the position of the motor 12 and in the direction along the rotary shaft of the motor 12. In this way, the inverter 11 can be connected to the motor 12 while avoiding heat interference with heat dissipation part for the heat of the motor 12, and thus raise in temperatures in the motor 12 and inverter 11 can be suppressed.

Incidentally, unlike the present embodiment, when the inverter 11 is arranged outside the hollow space of the road wheel 2a, the possibility of the scattering objects hitting the inverter 11 during vehicle traveling becomes high. In order to protect the inverter 11, raising case rigidity for the inverter 11 may be considered, however, in such case, drive unit 10 becomes large and thus the mass also increases. Also, when rigidity of the case is raised, because the heat resistance of the case itself becomes high, cooling function of the inverter 11 deteriorates.

In the present embodiment, since the inverter 11 is arranged inside the hollow space of the road wheel 2a, the possibility that the scattering objects hit the inverter 11 during vehicle traveling can be lowered. Also, since the possibility of the scattering objects hitting the inverter 11 becomes low, rigidity of the case 11a does not need to be enhanced more than required that downsize of the drive unit 10 can be achieved.

Figure 6:
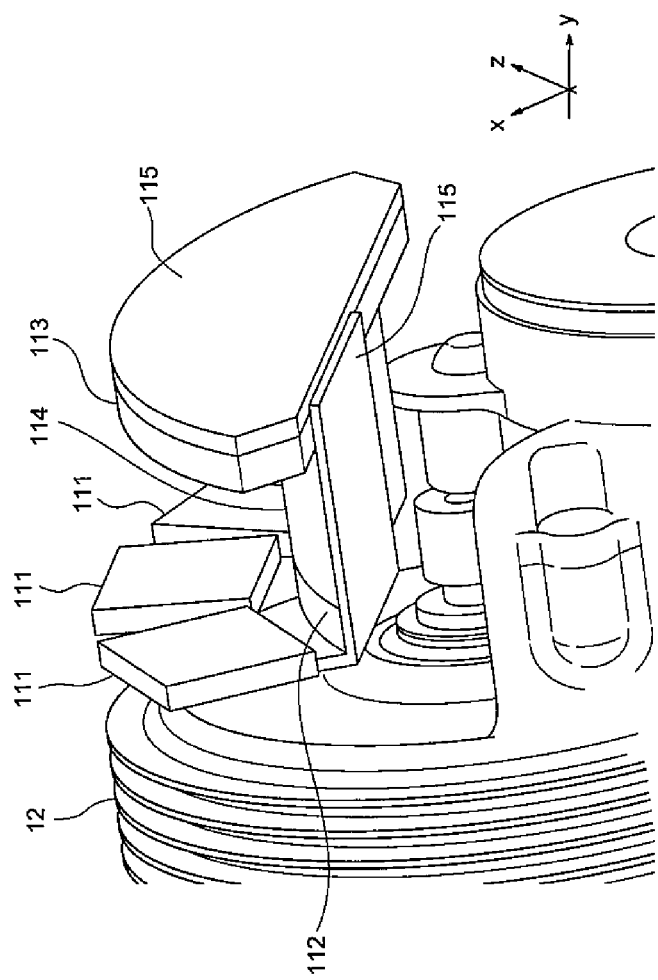
FIG. 6 is a figure where periphery of the inverter is enlarged and illustrates a perspective view of a part of the drive unit.

Next, using FIG. 6, each component of the inverter 11 will be explained. FIG. 6 is a figure where periphery of the inverter 11 is enlarged and illustrates a perspective view of an enlarged part of the drive unit 10. However, FIG. 6 illustrates a case where a case of the inverter 11 is removed. The x-axis, y-axis, and z-axis shown in FIG. 6 are the same as those in FIG. 5.

The inverter 11 includes a power module 111, a drive circuit 112, a smoothing capacitor 113, motor controller 114, and a bus bar 115. The power module 111 is a power conversion circuit for converting direct-current power supplied from a battery 83 to alternating-current power and includes a plurality of switching elements. The switching elements are transistors such as IGBT, MOSFET or the like, and are connected in a three-phase bridge form. The power module 111 is modularized transistors, and as shown in FIG. 6, is formed to a rectangular shape. The power module 111 is formed from three modularized devices and is aligned along the vertical plane (the xz-plane shown in FIG. 6) relative to the rotary shaft of the motor 12.

The drive circuit 112 is a circuit for driving the switching element included in the power module 111. The drive circuit 112 is arranged in the vicinity of the power module 111. The smoothing capacitor 113 is a condenser for smoothing the power input from the battery 83 and outputting the smoothed power to the power module 111. The motor controller 114 is a controller for controlling the motor 12 by switching on and off of the switching element of the power module 111. The motor controller 114 receives a control signal from the ECU 84 and sends a drive signal of the power module 111 to the drive circuit 112 according to the state of the motor 12 (the number of motor rotation, current value, and heat generation state of the motor, etc.) so as to output requested output torque from the motor 12.

The bus bar 115 is a transmission line for supplying the power input to the inverter 11 from the battery 83 to the power module 111 and is formed to a metal plate shape.

Figure 7:
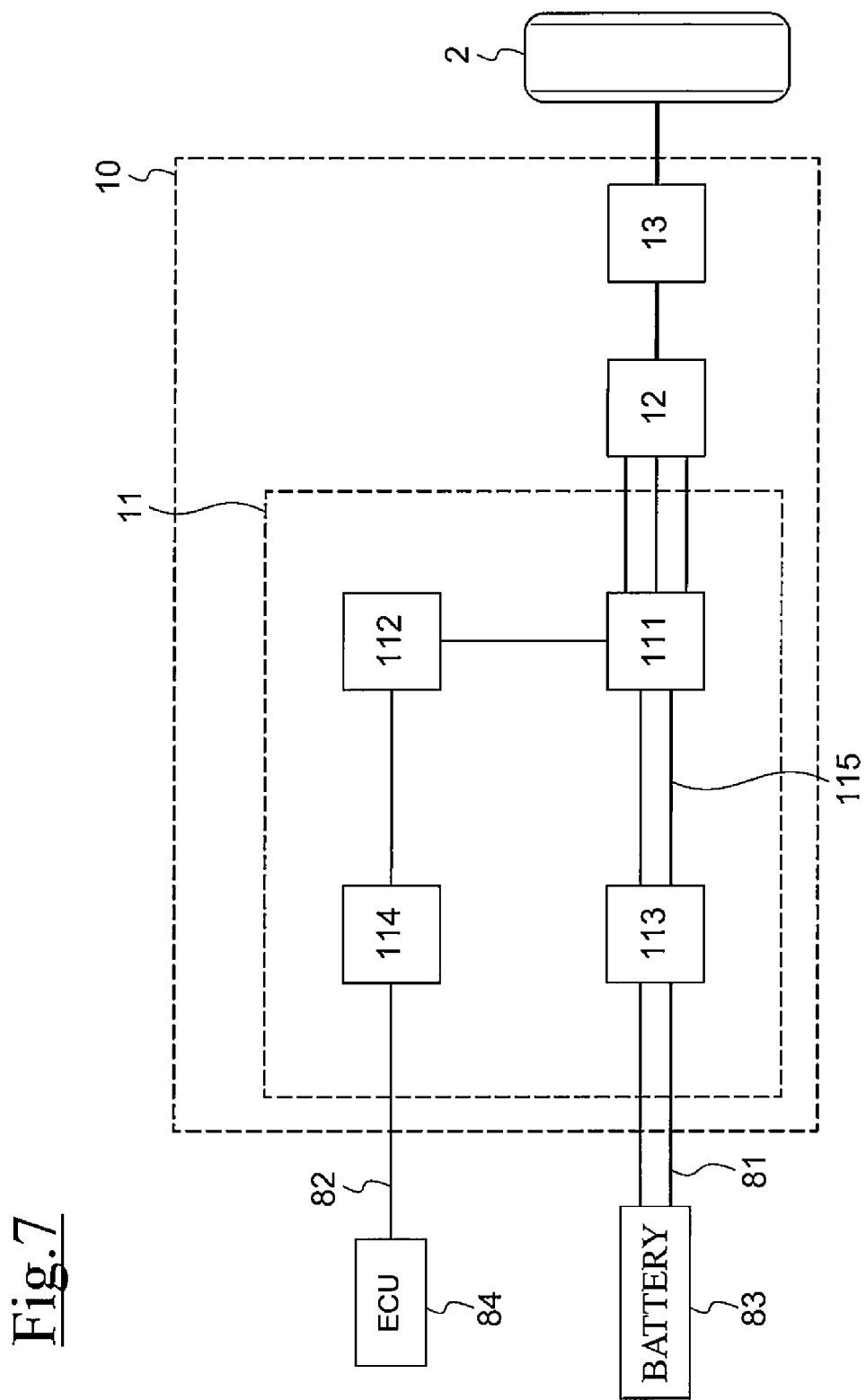
FIG. 7 is a block diagram of the drive unit.

Now, electrical connection of the inverter 11 will be explained with reference to FIG. 7. FIG. 7 is a block diagram of the drive unit. The battery 83 is a secondary battery and is disposed to the vehicle body. The battery 83 is connected to the inverter 11 with the cable 81. The ECU 84 is a controller for controlling the vehicle based on the state of the vehicle and operation by a driver. The state of the vehicle is such as vehicle speed and slip state of a tire, etc. The driver operation is such as accelerator operation, steering operation, and brake operation, etc. The ECU 84 is arranged to the vehicle body and connected to the inverter 11 by the harness 82 for control signals.

The smoothing capacitor 113 is connected between the battery 83 and power module 111. The DC line from the battery 83 to power module 111 is a pair of lines and the smoothing capacitor 113 is connected between the line of the positive side and the line of the negative side. The DC line connecting between the power module 111 and smoothing capacitor 113 corresponds to the bus bar 115.

A three-phase wire connects between the power module 111 and the motor 12. Between the power module 111 and drive circuit 112, and the drive circuit 112 and motor controller 114 are each connected with a wire for control.

Figure 8:
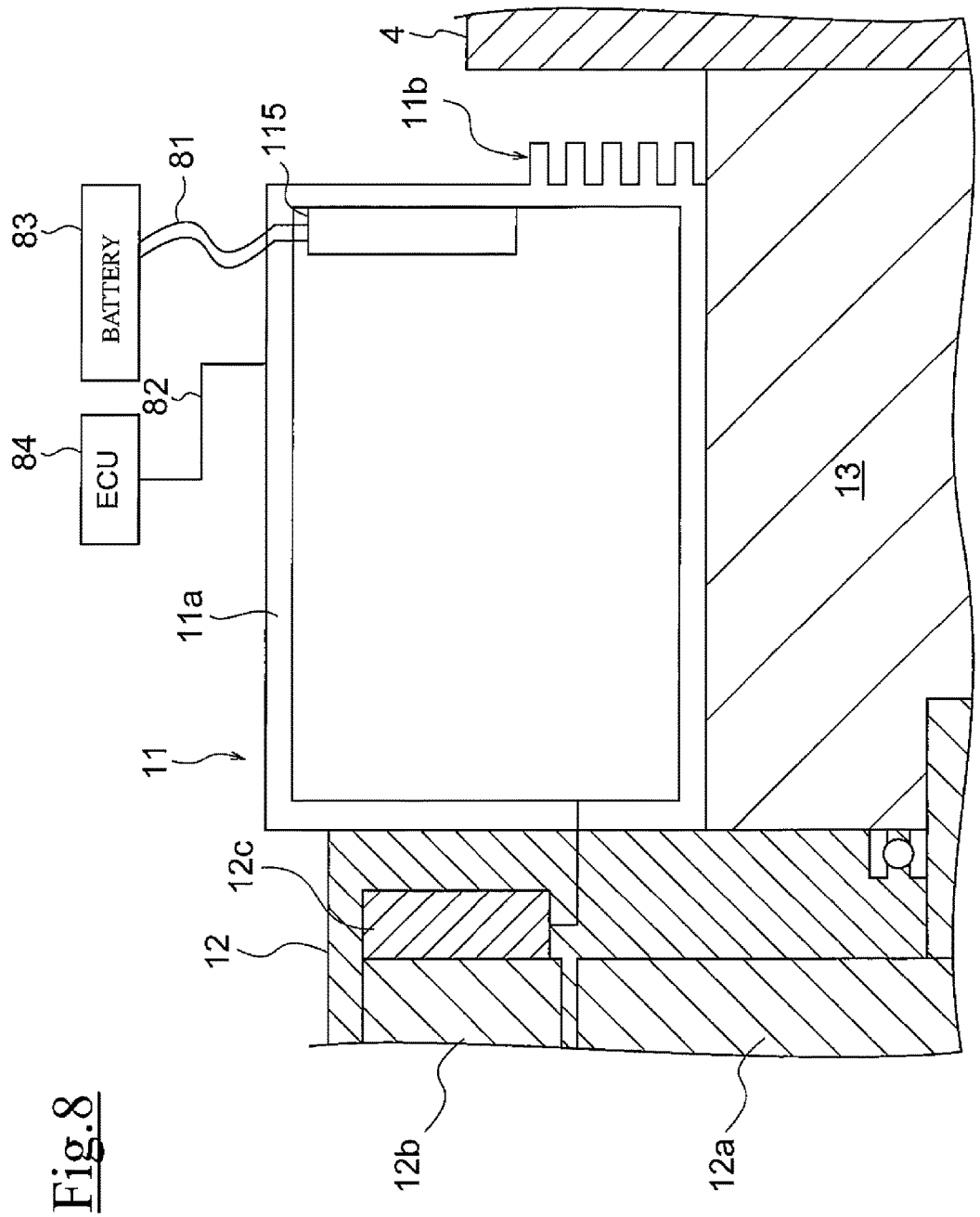
FIG. 8 illustrates a sectional view of a brake part, inverter, motor, and reduction gear.
Figure 9:
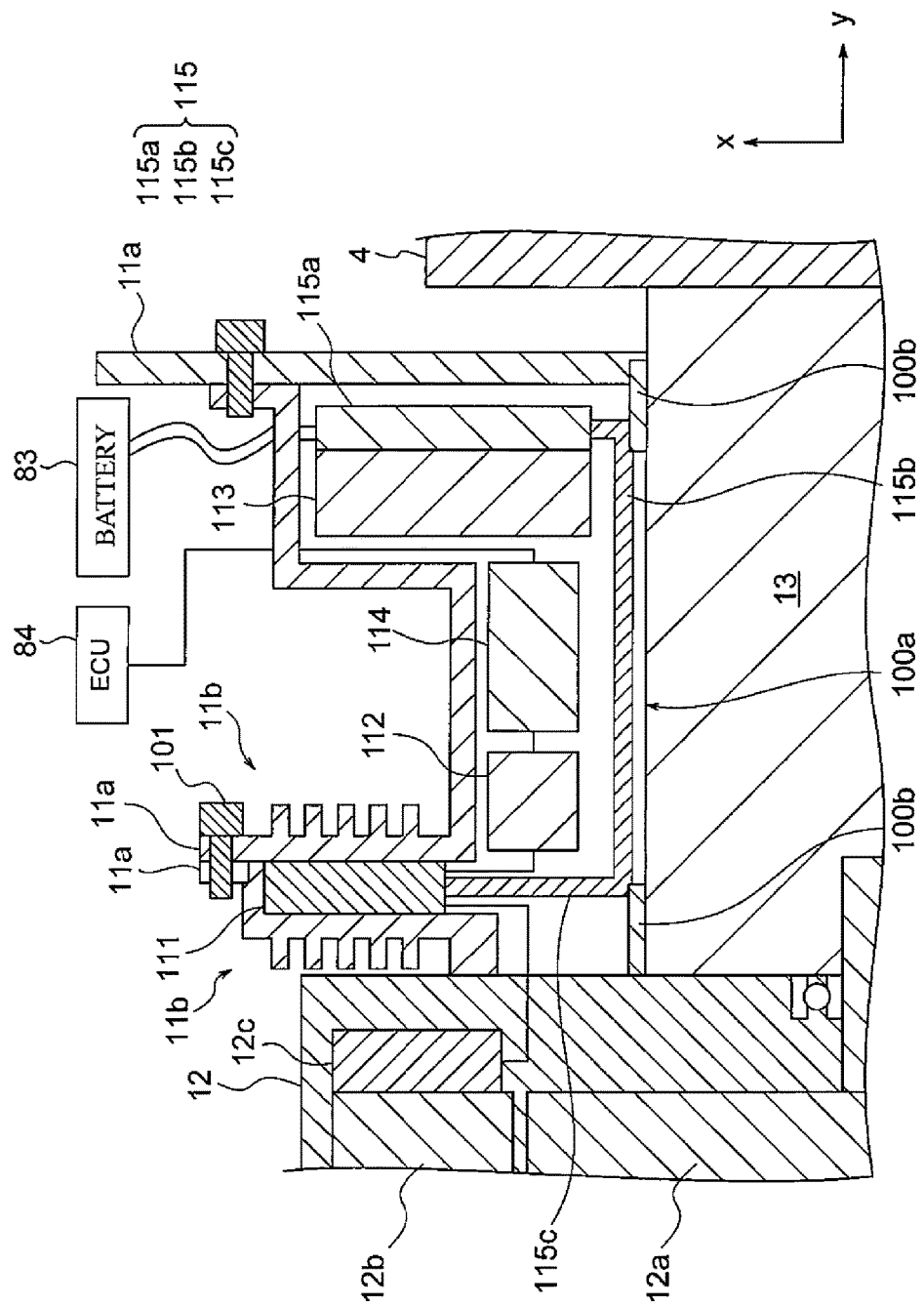
FIG. 9 illustrates a sectional view of the brake part, inverter, motor, and reduction gear.

Using FIG. 8 and FIG. 9, positional relationship between the brake part 4, each component of the inverter 11, the motor 12, and the reduction gear 13 will be explained. FIG. 8 and FIG. 9 illustrate sectional views of the brake part 4, inverter 11, motor 12, and reduction gear 13. Here, although the direction for cutting the section for the drive unit 10 is the same in FIG. 8 and FIG. 9, the position of the section is different.

The inverter 11 is arranged near the brake part 4. A cooler 11*b* is arranged to a surface close to the brake part 4 among the surfaces forming the case 11*a* of the inverter 11. The cooler 11*b* is a fin. In the present embodiment, establishment of the cooler 11*b* prevents heat generated at the brake part 4 from transmitting to internal parts of the inverter 11.

The inverter 11 is connected to the reduction gear 13. A connection surface 100*a* that connects the inverter 11 and reduction gear 13 is a surface parallel to the axle or a surface that is set along the surface of the rotary shaft of the motor 12.

The motor 12 includes a rotor 12*a* and a stator 12*b*. The rotor 12*a* is arranged so as to connect the rotary shaft of the rotor 12*a* to the reduction gear 13. To the peripheral part of the rotor 12*a*, a stator 12*b* is arranged. Then, a wire (bus bar) for AC connects a coil 12*c* wound around the stator 12*b* to the power module 111.

As can be seen from the above, in the present embodiment, the inverter 11 is arranged near the brake part 4 that the distance between the inverter 11 and brake part 4 becomes short and heat of the brake part 4 is easily transmitted to the inverter 11. In the present embodiment, in order to protect the power module 111 from the heat of the brake part 4, each component of the inverter 11 is arranged as described in the following.

The bus bar 115 is arranged to the side of the brake part 4 than the power module 111. In other words, when considered based on the conduction path of the heat generated at the brake part 4 to the power module 111, the bus bar 115 is arranged between the power module 111 and brake part 4 and to the position close to the brake part 4 inside the inverter 11. The heat generated at the brake part 4 is transmitted to the reduction gear 13 and to the inverter 11. The heat transmitted from the brake part 4 is easily transmitted to a part closest to the reduction gear 13 among the parts included in the inverter 11. As illustrated in FIG. 9, because the inverter 11 is connected to the reduction gear 13, the part close to the connection surface 100*a* between the inverter 11 and reduction gear 13 is likely to receive heat the most. The bus bar 115 includes a member 115*a* to member 115*c*. The member 115*a* extends in the x-direction and z-direction from a connection terminal connecting the cable 81, and is a plate-shape member made of metal formed to a wall-like shape with a surface set along the normal direction of the connection surface 100*a*. The member 115*b* extends in the y-direction and z-direction from the connection point to the member 115*a*, and is a plate-shape member made of metal formed to a wall-like shape with a surface that is set along the connection surface 100*a*. The member 115*c* extends from the connection point to the member 115*b* to the power module 111 and is a plate-shape member made of metal including a surface that is set along the normal direction of the connection surface 100*a*.

Among the members included in the bus bar 115, the member 115*b* is arranged wall-like to the position close to the connection surface 100*a*. In other words, at least a part of the bus bar 115 is arranged to the position closest to the reduction gear 13 among the parts included in the inverter 11. Further, the member 115*c* extends from the connection point to the member 115*b* so that the connection point between the bus bar 115 and power module 111 becomes apart from the member 115*b*. In this way, the power module 111 connected to the end part of the member 115*c* is arranged to the position that is apart from the reduction gear 13 through the bus bar 115.

By arranging the member 115*b* of the bus bar 115 close to the reduction gear 13, the heat transmitted to the reduction gear 13 from the brake part 4 is transmitted to the member 115*b* prior to the power module 111. In other words, since the heat of the brake part 4 is shut by the bus bar 115, the power module 111 is prevented from being heated to a high temperature. More, by arranging the power module 111 apart from the reduction gear 13, the power module 111 is also prevented from being heated to a high temperature since the power module 111 is apart from the heat source.

When considered from the y-direction, the member 115*a* of the bus bar 115 becomes a wall for separation between the brake part 4 and power module 111. In other words, the member 115*a* functions as a barrier for heat to the heat transmitted from the brake part 4 to the power module 111 since the member 115*a* is formed to a wall-like shape that extends along the xz-plane.

The drive circuit 112 and motor controller 114 are arranged on a plane that is parallel to the plane which is set along the connection surface 100*a*. More, the drive circuit 112 and motor controller 114 are arranged to the position apart from the member 115*b* of the bus bar 115 when considered from the normal direction of the connection surface 100*a*. The smoothing capacitor 113 is connected along the main surface of the member 115*a* of the bus bar 115.

The power module 111 is clamped by a plurality of cases 11*a*. To the cases 11*a* clamping the power module 111, a cooler 11*b* is arranged respectively. In other words, the power module 111 is clamped at the part of the cooler 11*b*. The plurality of cases 11*a* are fastened by a fastening member 101 such as a screw. The cases include a fastened part fastened by the fastening member 101 and unfastened part not fastened by the fastening part 101. A through hole is formed to the fastened part so as to pass the fastening member 101. The fastened part includes the the plane for joining each other by the fastening member 101. The fastened part is arranged to the position slightly apart from the position of the power module 111. The power module 111 is arranged in a space surrounded by planes forming the unfastened part. In this way, when a force is applied between the reduction gear 13 and motor 12 by compression or tension, pressure is applied to the case 11*a* of the inverter 11. On the other hand, the pressure is hardly applied to the power module 111. As a result, the power module 111 can be protected.

To the connection surface 100a, a support member 100b for supporting the bus bar 115 is disposed. The support member 100b is an insulating member for supporting the bent part of the bus bar 115. Also, between a pair of support members 100b, there is a space. A lubricating oil is included in the reduction gear 13 and the reduction gear 13 is configured to scoop up the lubricating oil by rotation of the reduction gear 13. Since a space is formed to a part of the connection surface 100a, when the lubricating oil is scooped up by the rotation of the reduction gear 13, the lubricating oil adheres to the bus bar 115. Subsequently, heat of the bus bar 115 decreases and thus the transmission of heat from the bus bar 115 to the power module 111 can be prevented.

Further, the member 115b of the bus bar 115 is arranged along the connection surface 100a so as to separate the inverter 11 from the reduction gear 13. In this way, the lubricating oil scooped up by rotation of the reduction gear 13 hits the bus bar and thus it is possible to prevent the lubricating oil from being adhered to the drive circuit 112, the smoothing capacitor 113, the motor controller 114 and the control signal harness 82.

When viewed from the x-direction (the direction where the scooped-up oil scatters), the member 115b of the bus bar 115 functions as a wall for separation between a reduction gear 13 and power module 111. In other words, by forming the member 115 to a wall-like shape that extends along the yz-plane, the member 115b functions as a barrier for the oil against the oil scooped-up by the reduction gear 13.

As can be seen from the above, in the present embodiment, the bus bar 115 is arranged closer to the side of the brake part 4 than the power module 111. In this way, heat generated at the brake part 4 is hardly transmitted to the power module 111 due to the bus bar 115, and the power module 111 is prevented from being heated to a high temperature.

Additionally, in the present embodiment, the power module 111 is arranged to a position apart from the reduction gear 13 via a bus bar 115, and the bus bar 115 is arranged to the connection surface of the inverter 11 and reduction gear 13. In other words, a space is formed between the power module 111 and bus bar 115. As a result, the space between the power module 111 and bus bar 115 functions as a space for dissipating heat of the power module 111 and thus heat dissipation performance of the power module 111 can be enhanced.

Further, the bus bar 115 may be in contact with the case of the inverter 11 via an insulating member, or to the case of the reduction gear 13 via the insulating member.

<Second embodiment>

Figure 10:
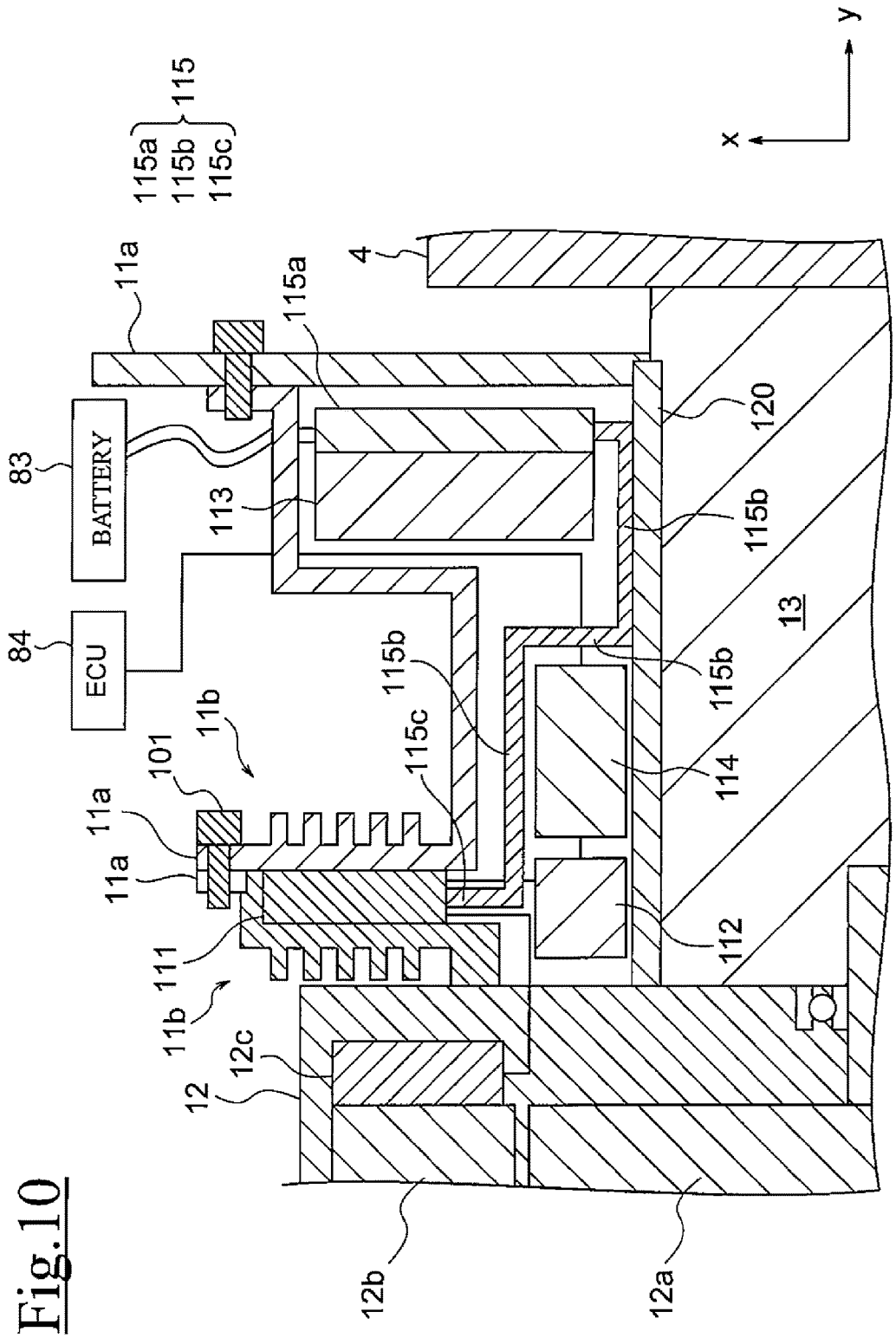
FIG. 10 illustrates a sectional view of the brake part, inverter, motor, and reduction gear of an in-wheel motor unit according to another embodiment of the present invention.

An in-wheel motor unit according to another embodiment of the present invention will be described. FIG. 10 illustrates a sectional view of the brake part 4, inverter 11, motor 12, and reduction gear 13. The present example differs from the first embodiment described above in the point that a partition 120 is included. Other structures are the same as those described in the first embodiment and descriptions thereof are referenced.

The partition 120 is arranged between the inverter 11 and reduction gear 13. The partition 120 becomes a wall for separating an inner space of the inverter 11 and the reduction gear 13 by being a part of the case of the inverter 11. The partition 120 is formed to a plate shape with a material with high heat conductivity. The partition 120 corresponds to a connection surface of the inverter 11 and reduction gear 13. The inverter 11 is arranged near the reduction gear 13 via the partition 120.

The bus bar 115 includes the member 115a to member 115c. The member 115a is the same as the one in the first embodiment. The member 115b is formed to a bent shape, a part of the member 115b is arranged along the surface of the partition 120 and is in contact with the surface of partition 120. To a space formed between the partition 120 and the member 115b, which is formed by bending of the member 115b, the drive circuit 112 and motor controller 114 are arranged.

The power module 111 is arranged apart from the reduction gear 13 via the bus bar 115 and the partition 120.

As can be seen from the above, in the present embodiment, the partition 120 is arranged between the inverter 11 and reduction gear 13, a part of the bus bar 115 is in contact with the partition 120, and the power module 111 is arranged apart from the reduction gear 13 via the bus bar 115 and partition 120. In this way, heat generated at the brake part 4 is hardly transmitted to the power module 111 due to partition 120 and bus bar 115 and thus the power module 111 is prevented from being heated to a high temperature.

Further, because the partition 120 is arranged between the inverter 11 and reduction gear 13, the lubricating oil scooped up by rotation of the reduction gear 13 hits the partition 120 and it is possible to prevent the lubricating oil from scattering to the power module 111, drive circuit 112, smoothing capacitor 113, motor controller 114, and control signal harness 82. When the brake part 4 is at a high temperature and when in the state where heat of the brake part 4 is easily transmitted to the partition 120, by adhesion of the lubricating oil scooped-up by rotation of the reduction gear 13 to the partition 120, raise in the temperature of the partition 120 can be suppressed. As a result, the heat is hardly transmitted to the power module 111 from the partition 120 via the bus bar 115, and thus protection of the power module 111 can be achieved.

Figure 11:
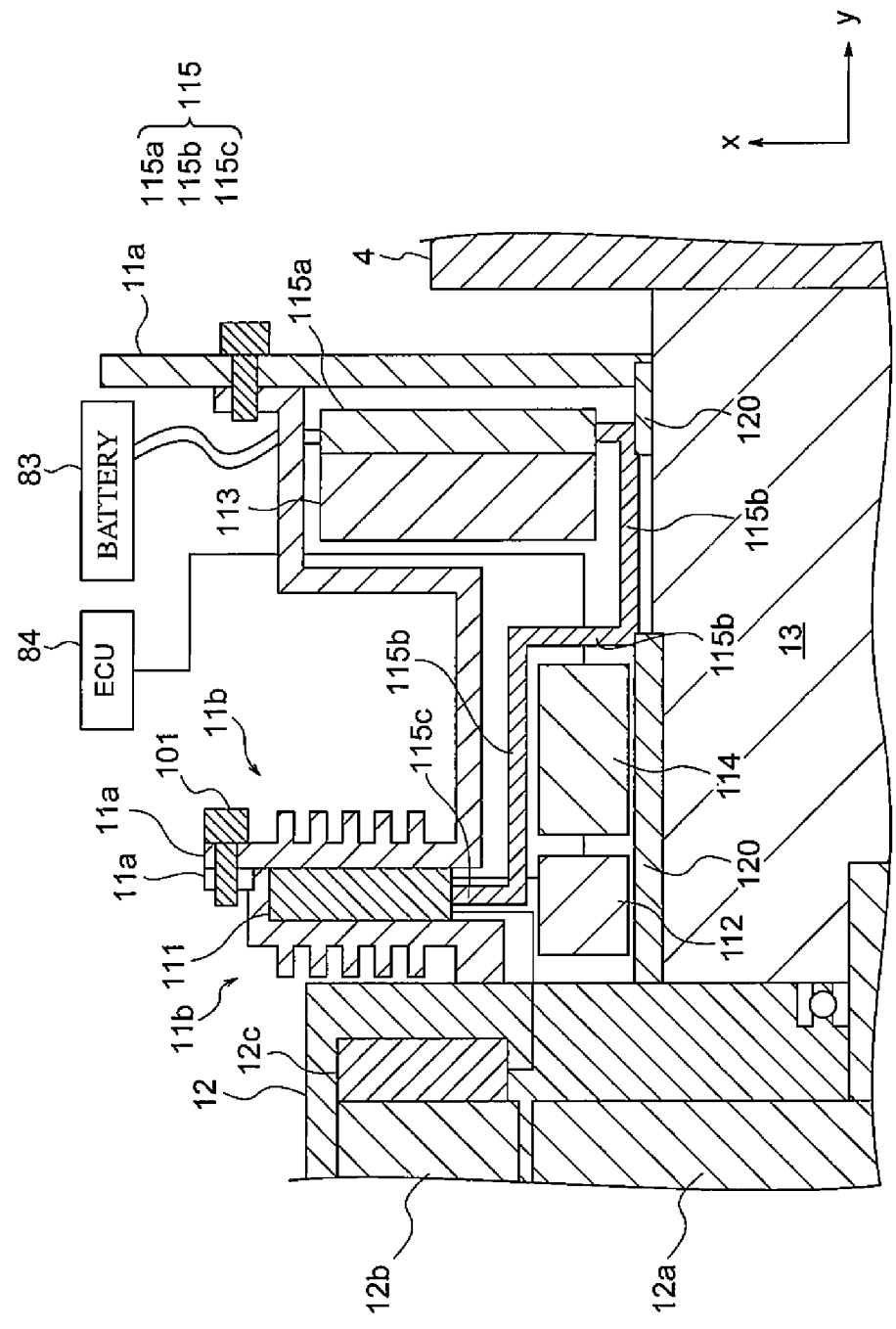
FIG. 11 illustrates a sectional view of the brake part, inverter, motor, and reduction gear of an in-wheel motor unit according to a modified example of the present invention.

Additionally, as a modified example of the arrangement structure of the in-wheel motor unit according to the present embodiment, the partition 120 may be disposed to a part of the connection surface between the inverter 11 and reduction gear 13. FIG. 11 illustrates a section of the brake part 4, inverter 11, motor 12, and reduction gear 13 for the in-wheel motor unit according to the modified example.

The partition 120 includes a pair of plate-shape member. Between the pair of plate-shape members, one member supports the connection point of the member 115a and member 115b of the bus bar 115. The other member of the pair of plate-shape member is a case for the drive circuit 112 and motor controller 114, and one end of the other member is connected to the bending point of the member 115b. Also, in the member 115b of the bus bar 115, no partition 120 is arranged to the part near the reduction gear 13. As to the connection surface between the inverter 11 and reduction gear 13, the member 115b is arranged to the part that is not covered by the partition 120. The partition 120 and the member 115b of the bus bar 115 separate the inverter 11 from reduction gear 13.

In this way, heat generated at the brake part 4 is hardly transmitted to the power module 111 by the partition 120 and bus bar 115, and thus the power module 111 can be prevented from being heated to a high temperature. Also, because the lubricating oil scooped up by rotation of the reduction gear 13 hits the partition 120 or bus bar 115, it is possible to prevent the lubricating oil from scattering to the power module 111, drive circuit 112, smoothing capacitor 113, motor controller 114, and control signal harness 82 can be obtained.

Further, by scooping up the lubricating oil by rotation of the reduction gear 13 and adhering to the partition 120 and member 115b, raise of the temperature in the partition 120 and the member 115b can be suppressed. As a result, heat of the brake part 4 is hardly transmitted to the power module 111 via the partition 120 and bus bar 115 and thus protection of the power module 111 can be achieved.

Figure 12:
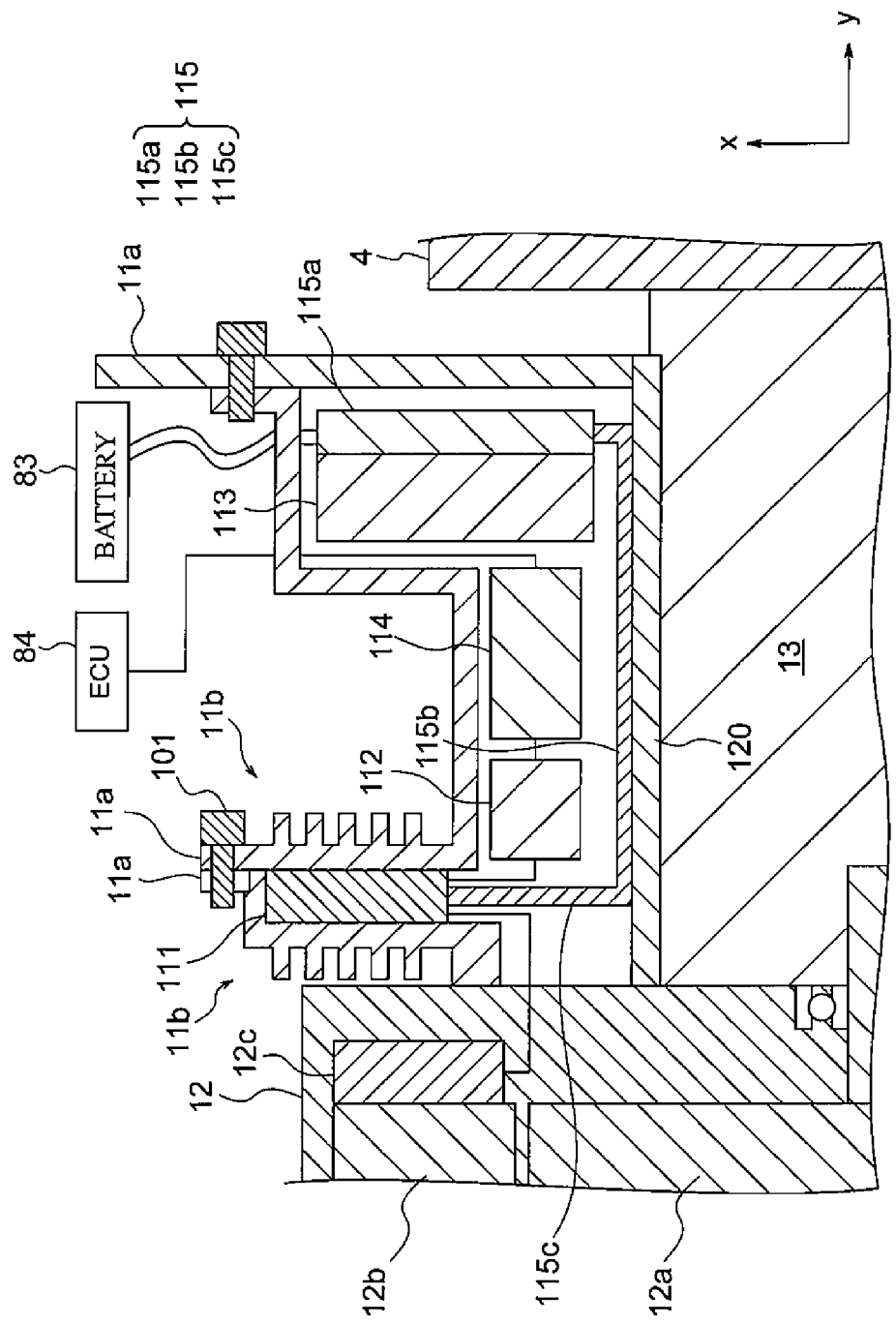
FIG. 12 illustrates a sectional view of the brake part, inverter, motor, and reduction gear of an in-wheel motor unit according to the modified example of the present invention.

Also, as a modified example of the arrangement structure of the in-wheel motor unit according to the present embodiment, the shape of the member 115b is not necessarily made to a bent shape, and like in the first embodiment, may be in the form of a single plate. FIG. 12 illustrates a section of the brake part 4, inverter 11, motor 12, and reduction gear 13 of the in-wheel motor unit according to the modified example. As shown in FIG. 12, the partition 120 is arranged along the surface of the bus bar 115 and member 115b.

Figure 13:
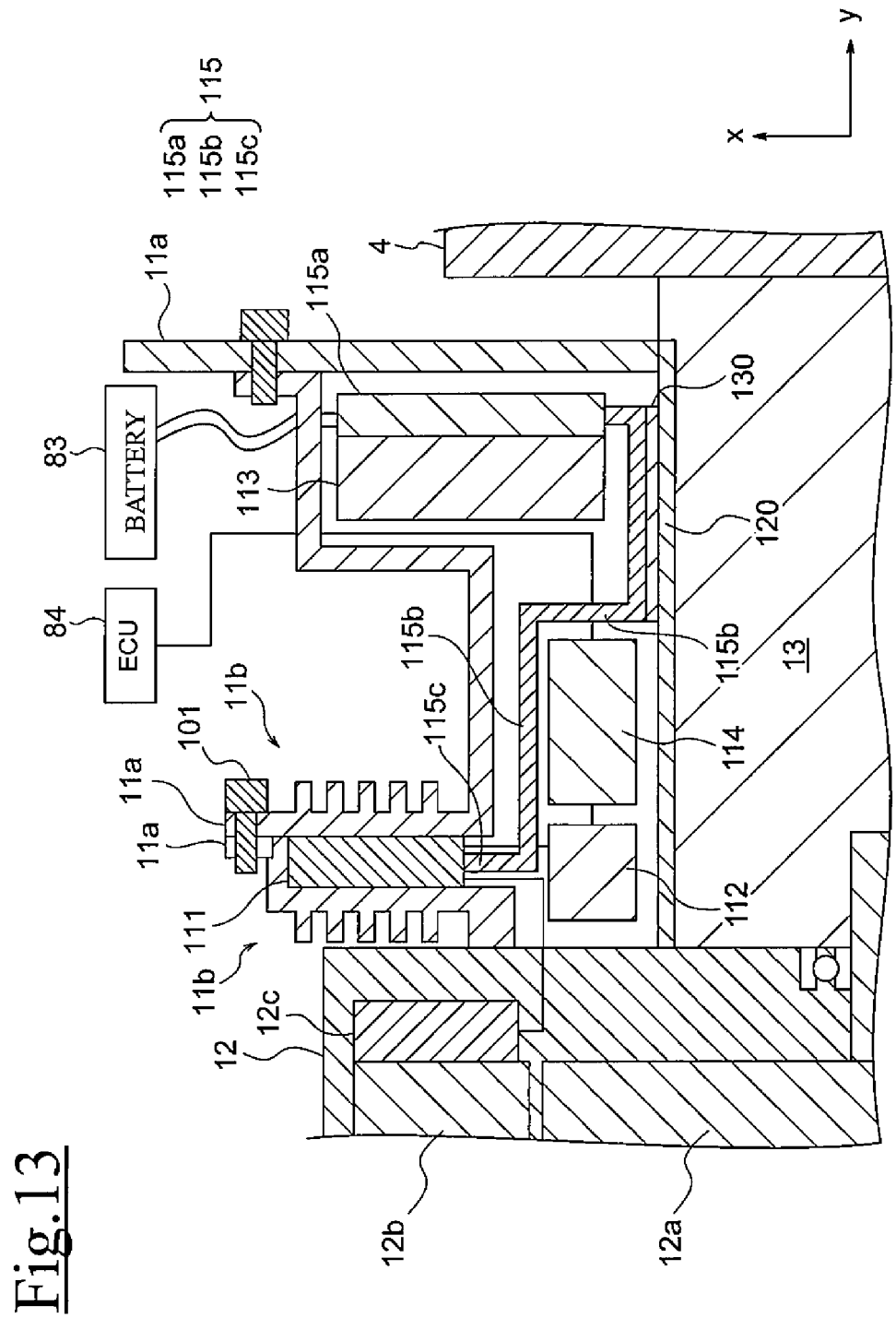
FIG. 13 illustrates a sectional view of the brake part, inverter, motor, and reduction gear of the in-wheel motor unit according to the modified example of the present invention.

Also, as a modified example of the arrangement structure of the in-wheel motor unit according to the present embodiment, a high heat-conductivity member 130 may be disposed between the bus bar 115 and partition 120. FIG. 13 illustrates a section of the brake part 4, inverter 11, motor 12, and reduction gear 13 of the in-wheel motor unit according to the modified example. The high heat-conductivity member 130 is the member for enhancing heat conductivity between the bus bar 115 and partition 120. The high heat-conductivity member 130 is made from material having high heat conductivity and is formed to a plate shape.

When the high heat-conductivity member 130 is made with an insulating material, the member 115b of the bus bar 115 may be directly connected to the high heat-conductivity member 130. Additionally, when the high heat-conductivity member 130 is made with a conductive material, at least part of the member 115b is covered with the insulating material and the member 115b is placed adjacent to the partition 120 via the high heat-conductivity member 130.

In this way, in a state in which temperature of the bus bar 115 is high, when the lubricating oil (in a low-temperature state) scooped up by rotation of the reduction gear 13 is hit by the partition, heat of the bus bar 115 transmits to the partition 120 via the high heat-conductivity member 130 and thus the temperature of the bus bar 115 can be suppressed. As a result, while securing insulation performance of the bus bar 115, the power module 111 can be prevented from being heated to a high temperature.

Additionally, in the present embodiment, the high heat-conductivity member 130 made with the insulating material corresponds to an "insulator" of the present invention, and the high heat-conductivity member 130 formed with the conductive material corresponds to a "conductor" of the present invention.

<Third embodiment>

Figure 14:
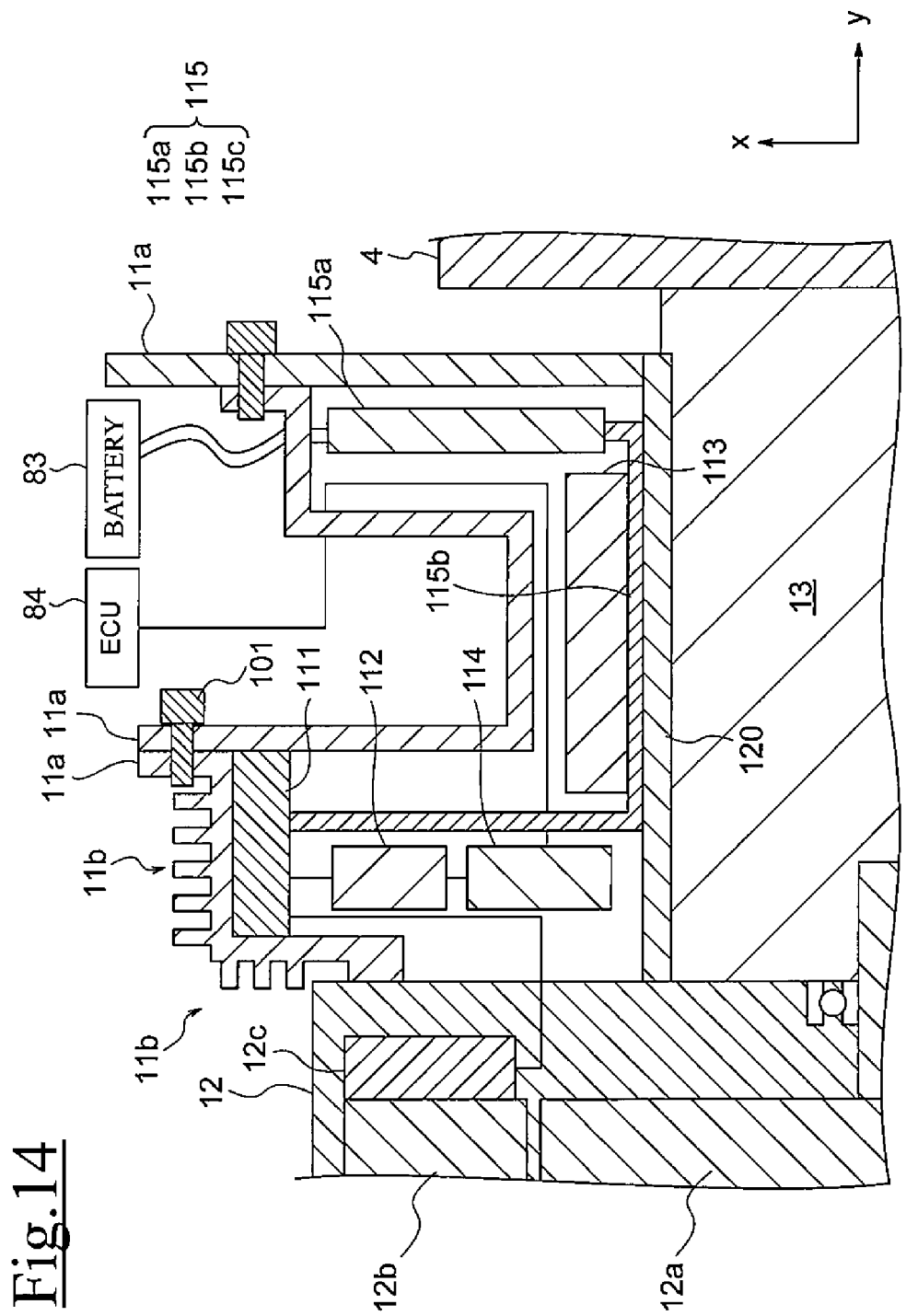
FIG. 14 illustrates a sectional view of the brake part, inverter, motor, and reduction gear of an in-wheel motor unit according to another embodiment of the present invention.

The in-wheel motor unit according to another embodiment of the present invention will be described. FIG. 14 is a sectional view of the brake part 4, inverter 11, motor 12, and reduction gear 13. In the present example, positions of the drive circuit 112, smoothing capacitor 113, and motor controller 114 are different compared to the second embodiment described above. Other structures are the same as those in the second embodiment and descriptions thereof are referenced.

The smoothing capacitor 113 is a condenser with high heat resistivity. For the smoothing capacitor 113, for example, a ceramic condenser is used. The smoothing capacitor 113 is arranged on the surface of the member 115b of the bus bar 115.

The drive circuit 112 and motor controller 114 are arranged to a space formed between the connection surface between the inverter 11 and motor 12 and the member 115a of the bus bar 115. The cooler 11b is formed to the case 11a surrounding the power module 111.

Heat of the brake part 4 may transmit through the reduction gear 13 and partition 120 and the temperature of the bus bar 115 may become high. Since the smoothing capacitor 113 is connected to the bus bar 115, the temperature of the smoothing capacitor 113 may also become high. In the present embodiment, a condenser with high heat resistivity is used as the smoothing capacitor 113. For this reason, when the heat of the brake part is transmitted to the smoothing capacitor 113, a loss of the functions of the smoothing capacitor 113 can be suppressed.

Figure 15:
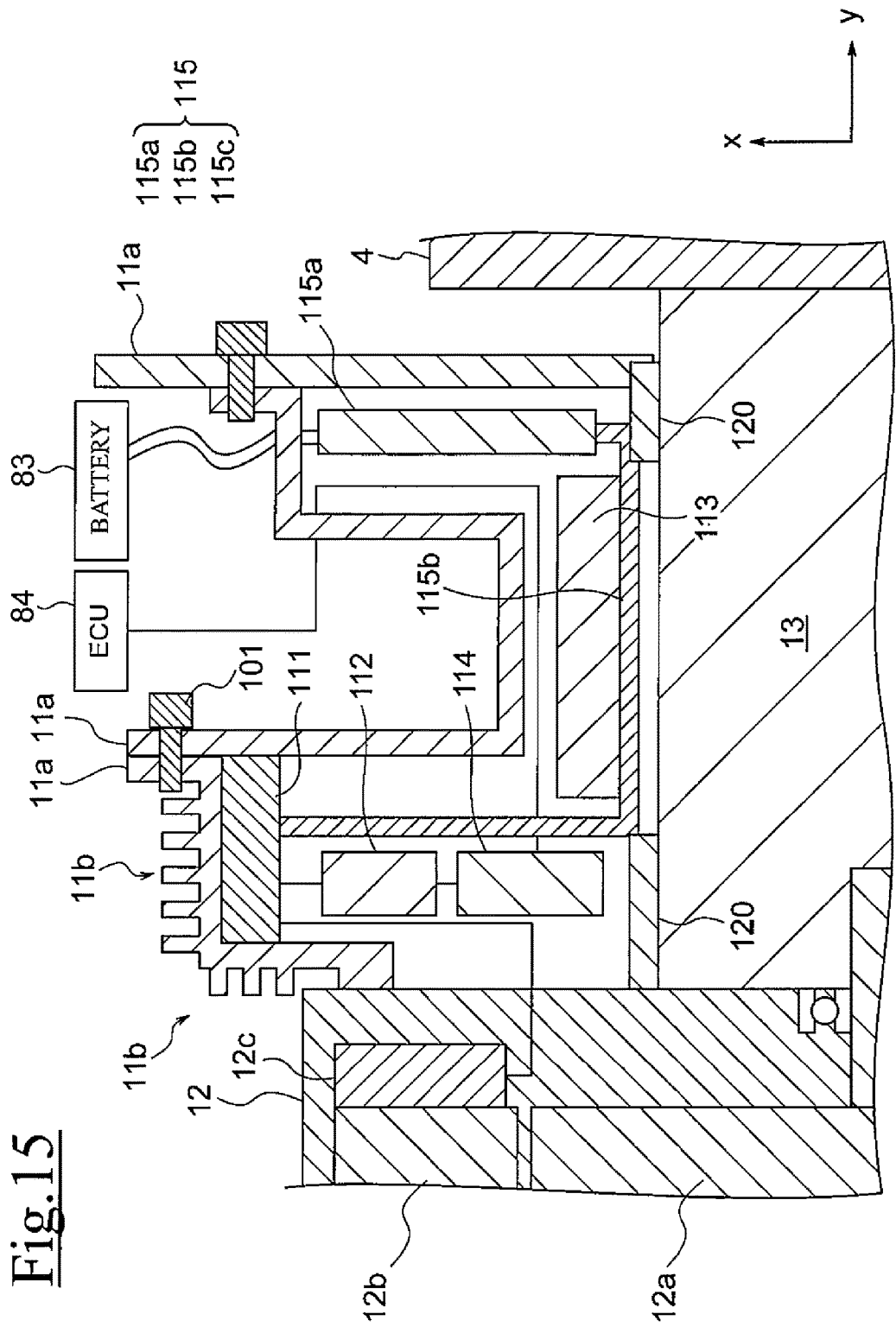
FIG. 15 illustrates a sectional gear of the brake part, inverter, motor, and reduction gear of the in-wheel motor unit according to the modified example of the present invention.

As a modified example of the arrangement structure of the in-wheel motor unit according to the present embodiment, the partition 120 may be disposed to a part of the connection surface between the inverter 11 and reduction gear 13. FIG. 15 illustrates a section of the brake part 4, inverter 11, motor 12, and reduction gear 13 of the in-wheel motor unit according to the modified example.

The partition 120 includes a pair of plate-shape members. Of the plate-shape members, one member supports the connection point of the member 115a and member 115b of the bus bar 115. The other member of the plate-shape member supports the connection point of the member 115b and member 115c. In the member 115b of the bus bar 115, no partition 120 is disposed to the part adjacent to the reduction gear 13. To the connection surface between the inverter 11 and reduction gear 13, the member 115b is arranged to the part not covered with the partition 120. The partition 120 and member 115b of the bus bar 11 separates the inverter 11 from reduction gear 13.

In this way, heat generated at the brake part 4 is hardly transmitted to the power module 111 by the partition 120 and bus bar 115, and accordingly the power module 111 can be prevented from being heated to a high temperature. More, since the lubricating oil scooped up by the reduction gear 13 hits the partition 120 and the bus bar 115, it is possible to prevent the the lubricating oil from adhering to the power module 111, drive circuit 112, smoothing capacitor 114, motor controller 114 and control signal harness 82.

Further, by scooping up the lubricating oil by rotation of the reduction gear 13 and adhering to the partition 120 and member 115b, temperature raise in the partition 120 and member 115b can be suppressed. As a result, heat of the brake part 4 is hardly transmitted to the power module 111 and thus protection of the power module 111 can be achieved.

<Fourth embodiment>

Figure 16:
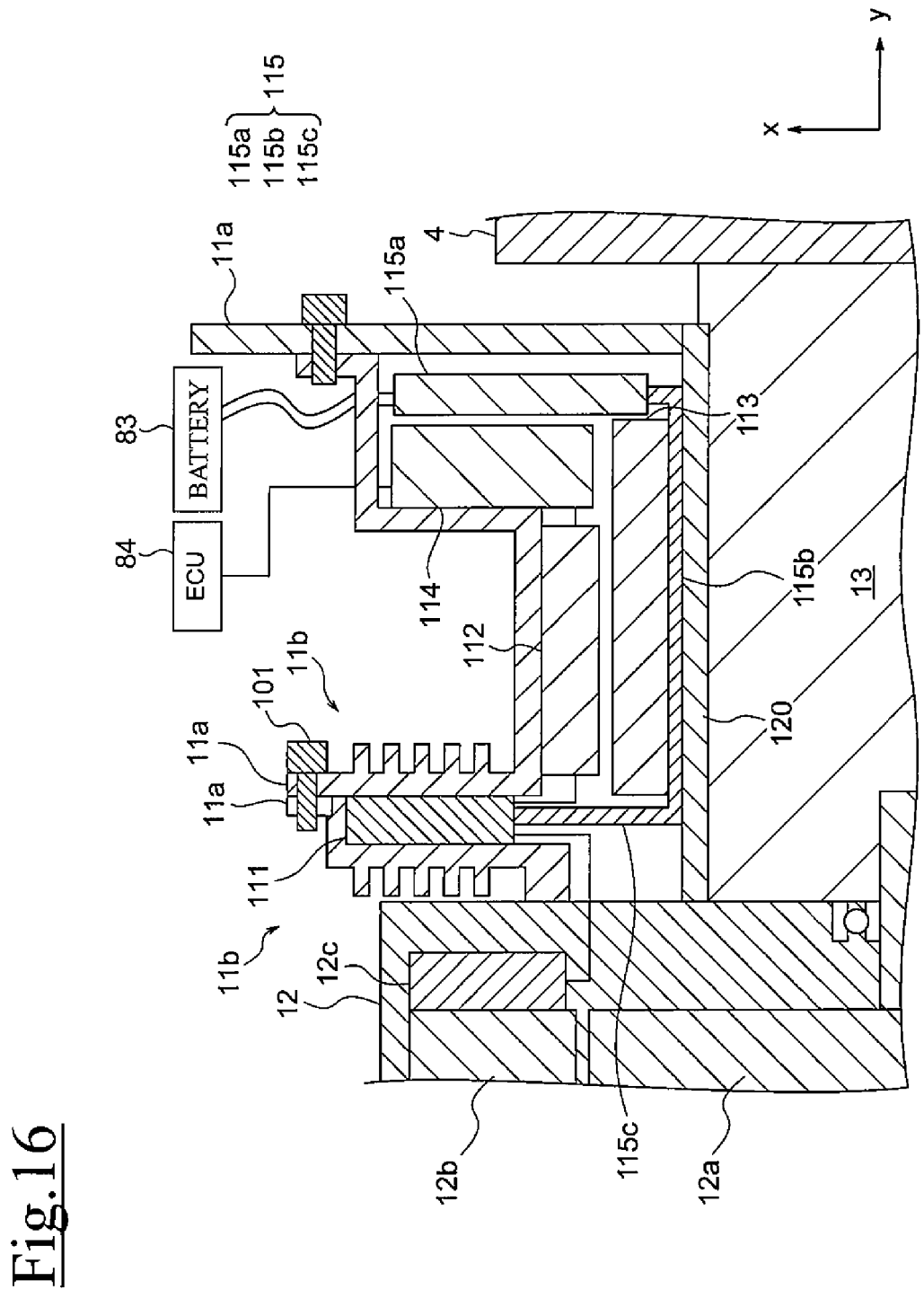
FIG. 16 illustrates a sectional view of the brake part, inverter, motor, and reduction gear of the in-wheel motor unit according to another embodiment of the present invention.

The in-wheel motor unit according to another embodiment of the present invention will be explained. FIG. 16 illustrates a sectional view of the brake part 4, inverter 11, motor 12, and reduction gear 13. In the present example, positions of the drive circuit 112 and motor controller 114 are different compared to the third embodiment described above. Other structures are the same as those in the third embodiment and the descriptions thereof are referenced.

The drive circuit 112 and motor controller 114 are attached to the case 11a. A plurality of cases 11a are fastened with a fastening member 101. The case 11a where the drive circuit 112 and motor controller 114 are combined and the case 11a where the power module 111 is combined are the same case. Also, to the case 11a where the drive circuit 112, motor controller 114, and power module 111 are combined, the cooler 11b is arranged. Accordingly, heat of the power module 111 is dissipated by the case 11a, and similarly, heat of the drive circuit 112 and heat of the motor controller 114 are dissipated by the case 11a. In other words, the connection surface between the power module 111 and case 11a functions as a heat dissipation surface and similarly, the connection surface between the drive circuit 112 and case 11a and the connection surface between the motor controller 114 and case 11a function as the heat dissipation surfaces.

The power module 111 and drive circuit 112 are adjacent to each other and attached to the case 11a. Also, the drive circuit 112 and motor controller 113 are adjacent to each other and attached to the case 11a. In this way, the length of the wire between the power module 111 and drive circuit 112 and the length of the wire between the drive circuit 112 and motor controller 113 can be made shorter. In other words, in the present embodiment, while enhancing heat dissipation of the power module 111, drive circuit 112, and motor controller 114, reduction of inductance can be achieved.

As can be seen from the above, in the present embodiment, the drive circuit 112 is attached to the surface of the case 11a. In this way, because the connection surface for the drive circuit 112 and case 11a functions as a heat dissipation surface, drive circuit 112 can be protected.

Figure 17:
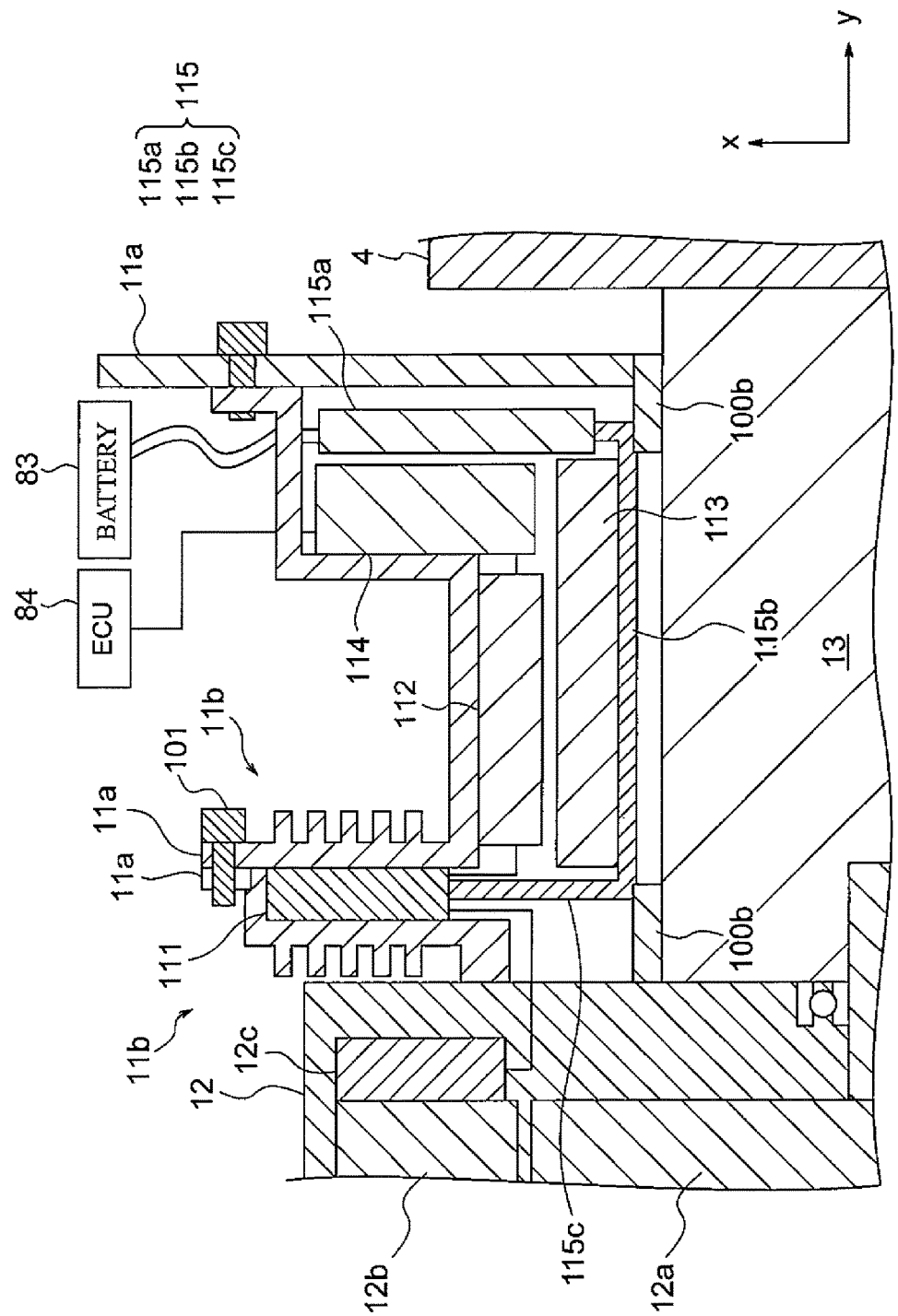
FIG. 17 illustrates a sectional view of the brake part, inverter, motor, and reduction gear of the in-wheel motor unit according to the modified example of the present invention.

Furthermore, as a modified example of the arrangement structure of the in-wheel motor unit according to the present embodiment, the partition 120 may be disposed to a part of the connection surface between the inverter 11 and reduction gear 13. FIG. 17 illustrates a section of the brake part 4, inverter 11, motor 12, and reduction gear 13 of the in-wheel motor unit according to the modified example.

The partition 120 includes a pair of plate-shape members. Of the pair of plate-shape members, one member supports the connection point of the member 115a and member 115b of the bus bar 115. The other member of the pair of plate-shape members supports the connection point between the member 115b and member 115c. As to the member 115b of the bus bar 115, to the part adjacent to the reduction gear 13, partition 120 is not arranged. As to the connection surface between the inverter 11 and reduction gear 13, member 115b is disposed to the part not covered with the partition 120. The partition 120 and the member 115b of the bus bar 115 separates the inverter 11 from reduction gear 13.

DESCRIPTION OF REFERENCE NUMERALS

1 . . . In-wheel motor unit
2 . . . Wheel
3 . . . Hub
4 . . . Brake part
5 . . . Suspension
6 . . . Ball joint
7 . . . Steering knuckle
8 . . . Steering rod
10 . . . Drive unit
11 . . . Inverter
11a . . . Case
11b . . . Cooler
12 . . . Motor
13 . . . Reduction gear
15 . . . Bus bar
81 . . . Cable
82 . . . Harness
101 . . . Fastening member
111 . . . Power module
112 . . . Drive circuit
113 . . . Smoothing capacitor
114 . . . Motor controller
115 . . . Bus bar
115a to 115c . . . Member
120 . . . Partition
130 . . . High heat-conductivity member

What is claimed is:

1. An arrangement structure of a wheel drive system comprising:
   a tire wheel; and
   a drive unit for driving the tire wheel,
   wherein the tire wheel includes a brake part arranged in a hollow space of the tire wheel,
   the drive unit includes a motor and an inverter for driving the motor,
   the inverter includes a power module for supplying power to the motor, and a bus bar which transmits power supplied from an outside of the tire wheel to the power module, and
   the bus bar is arranged between the brake part and the power module.

2. The arrangement structure of the wheel drive system according to claim 1, wherein the bus bar is plate-shaped.

3. The arrangement structure of the wheel drive system according to claim 1 comprising:
   a reduction gear for transmitting power of the motor to the tire wheel,
   wherein the inverter is arranged adjacent to the reduction gear,
   at least a part of the bus bar is arranged near the reduction gear, and
   the bus bar is arranged between the power module and the reduction gear.

4. The arrangement structure of the wheel drive system according to claim 1, comprising:
   a reduction gear for transmitting power of the motor to the tire wheel; and
   a partition arranged between the reduction gear and the inverter,
   wherein the inverter is arranged near the reduction gear via the partition,
   at least a part of the bus bar is in contact with the partition, and
   the bus bar and the partition are arranged between the power module and the reduction gear.

5. The arrangement structure of the wheel drive system according to claim 1, comprising:
   a reduction gear for transmitting power of the motor to the tire wheel;
   a partition arranged between the reduction gear and the inverter; and
   an insulator arranged between the partition and the inverter and formed with a high heat-conductivity member,
   wherein the bus bar, the insulator and the partition are arranged between the power module and the reduction gear.

6. The arrangement structure of the wheel drive system according to claim 1, comprising:
   a reduction gear for transmitting power of the motor to the tire wheel;
   a partition arranged between the reduction gear and the inverter; and
   a conductor arranged between the partition and the inverter and formed with a high heat-conductivity member,
   wherein
   at least one part of the bus bar is covered with an insulating member, and
   the bus bar, the conductor and the partition are arranged between the power module and the reduction gear.

7. The arrangement structure of the wheel drive system according to claim 1, comprising:
a reduction gear for transmitting power of the motor to the tire wheel,
wherein the reduction gear includes a lubricating oil, and the bus bar is arranged between the power module and the reduction gear.

8. The arrangement structure of the wheel drive system according to claim 1, comprising:
a reduction gear for transmitting power of the motor to the tire wheel,
wherein the inverter is arranged adjacent to the reduction gear, and
the bus bar is arranged between the power module and the reduction gear.

9. The arrangement structure of the wheel drive system according to claim 1,
wherein a space is formed between the power module and the bus bar to dissipate heat of the power module.

10. The arrangement structure of the wheel drive system according to claim 1,
wherein the inverter includes a case for housing the power module and the bus bar,
the case includes a fastening part fastened by a fastening member and an unfastened part not fastened by the fastening member, and
the power module is arranged in a space surrounded by the unfastened part.

11. The arrangement structure of the wheel drive system according to claim 1, comprising:
a reduction gear for transmitting power of the motor to the tire wheel,
wherein the inverter includes a smoothing capacitor electrically connected to the bus bar and is arranged near the reduction gear,
at least one part of the bus bar is an inverter component closest to the reduction gear, and
the smoothing capacitor is arranged above the at least one part of the bus bar.

12. The arrangement structure of the wheel drive system according to claim 1,
wherein the inverter includes a drive circuit for driving the power module, and a case for housing the power module, the bus bar, and the drive circuit, and
the drive circuit is attached to a surface of the case.

13. The arrangement structure of the wheel drive system according to claim 1, wherein the inverter is arranged outward in a vehicle-width direction relative to a position of the motor.

* * * * *